United States Patent [19]

Hadden

[11] Patent Number: 5,380,119
[45] Date of Patent: Jan. 10, 1995

[54] RESILIENTLY YIELDABLE PICTURE FRAME CORNER INSERT

[76] Inventor: David M. Hadden, 241 N. Clark Ave., Los Altos, Calif. 94022

[21] Appl. No.: 80,193

[22] Filed: Jun. 21, 1993

[51] Int. Cl.6 .............................................. G09F 1/12
[52] U.S. Cl. ..................... 403/402; 40/152; 52/656.1; 52/775; 144/353; 144/371; 403/295
[58] Field of Search ............... 40/152, 155; 52/775, 52/656.1; 144/2 R, 329, 353, 371, 344; 403/182, 251, 265, 267, 295, 297, 298, 401, 402

[56] References Cited

U.S. PATENT DOCUMENTS

| | | |
|---|---|---|
| 111,128 | 1/1871 | Linscott . |
| 497,915 | 5/1893 | Fulghum . |
| 2,581,843 | 1/1952 | Edwards . |
| 2,702,926 | 3/1955 | Rahaim . |
| 2,989,788 | 6/1961 | Kessler . |
| 3,284,113 | 11/1966 | Howell . |
| 3,336,689 | 8/1967 | Miller . |
| 4,405,255 | 9/1983 | Wallace . |
| 4,493,583 | 1/1985 | Wallace . |
| 4,742,856 | 5/1988 | Hehr et al. ...................... 144/353 |

FOREIGN PATENT DOCUMENTS 153734 6/1932 Germany .

OTHER PUBLICATIONS

Wedgelok Joining System Pistorius Machine Co., Inc. Bulletin WL.
Thumbnail Operating Manual, Nielsen & Bainbridge.

*Primary Examiner*—W. Donald Bray
*Attorney, Agent, or Firm*—Flehr, Hohbach, Test, Albritton & Herbert

[57] ABSTRACT

A resiliently yieldable picture frame corner insert for use with a picture frame corner construction. The corner construction includes first and second elongate frame parts extending at right angles to each other and having juxtaposed end portions and longitudinal axes. Each of the end portions has a hole therein extending perpendicular to the longitudinal axis of the frame part and a slot extending from the hole and through the end portion. The corner insert is secured to the juxtaposed end portions for retaining them in contact with each other. The corner insert is formed as one piece and has first and second web portions disposed in the slots and first and second outer portions disposed in the holes. The web portions are resiliently yieldable with respect to each other and serve to apply yieldable forces tending to urge the juxtaposed end portions into engagement with each other. The first and second outer portions are enlarged with respect to the web portions and have forwardly tapered end portions which extend beyond the length of the web portions and are adapted to facilitate insertion of the corner insert into the end portions. In one embodiment, the first and second web portions extend in respective planes which intersect at an angle ranging from 80° to 95° and are tapered in cross-section in plan in a direction toward the outer portions.

26 Claims, 4 Drawing Sheets

FIG_1

FIG_2

FIG_3

FIG_4

FIG_5

FIG_6

FIG_9

FIG_7

FIG_10

FIG_8

FIG_11

FIG_12

FIG_13

FIG_15

FIG_14

FIG_16

RESILIENTLY YIELDABLE PICTURE FRAME CORNER INSERT

This invention relates to the interconnection of picture frame moulding and more particularly to corner inserts for use with precut and mitered individual lengths of picture frame moulding.

There are several available systems which permit picture frames to be formed from precut individual lengths of picture frame parts or moulding without the need for specialized tools or skills. These systems provide lengths of moulding with ends which have been mitered to a desired angle and profile and slotted to accept a particular corner wedge or insert. The corner inserts hold the moulding lengths together while they are glued or otherwise more permanently secured together. One of these systems produces a slot shown generally in FIGS. 3, 4, 6 and 9 and in more detail in U.S. Pat. Nos. 4,493,582, 4,593,734, 4,632,160, 4,715,415, 4,858,664 and 4,936,360. A competing preformed moulding system, commonly known as the Thumbnail frame joining system by Nielsen & Bainbridge of Edison, N.J., uses a slot shown generally in FIGS. 9, 12, 13 and 16. The generally rigid corner inserts of both of these systems suffer from the disadvantage of being incapable of accommodating misalignment tolerances inherent in the respective systems. The difference between a corner insert with an unacceptably loose fit and an unacceptably tight fit can be as little as a few thousandths of an inch.

In general, these profile and/or slot misalignments can result from a variety of factors which include failure of the operator to align the miter and routing machines for each cut, using the same tooling setup for different species of wood moulding, the length of time which wood is stored before being profiled, the sharpness of the cutting tool, the number of times the tool has been sharpened, the rate of penetration of the cutting tool into the wood and the revolutions per minute at which the cutting tool is rotated.

It is in general an object of the invention to provide a new and improved picture frame corner insert which facilitates aligned attachment of mitered and slotted picture frame parts.

Another object of the invention is to provide a picture frame corner insert of the above character which is resiliently yieldable so as to accommodate variations in the profile and slot alignment of the picture frame parts.

Another object of the invention is to provide a picture frame corner insert of the above character which distributes deflection and stress loads to minimize undesirable stress concentration points.

Another object of the invention is to provide a picture frame corner insert of the above character which permits fine manipulation and adjustment of the fit between joined picture frame parts.

These and other objects are achieved in accordance with the invention by providing a resiliently yieldable picture frame corner insert for use in a picture frame corner construction. The corner construction includes first and second elongate frame parts extending at right angles to each other and having juxtaposed end portions and longitudinal axes. Each of the end portions has a hole therein extending perpendicular to the longitudinal axis of the frame part and a slot extending from the hole and through the end portion. The corner insert is secured to the juxtaposed end portions of the first and second frame parts for retaining the juxtaposed end portions in contact with each other. The corner insert is formed as one piece and has first and second web portions disposed in the slots and first and second outer portions disposed in the holes. The web portions are resiliently yieldable with respect to each other and serve to apply yieldable forces tending to urge the juxtaposed end portions into engagement with each other.

The first and second outer portions are enlarged with respect to the web portions and have forwardly tapered end portions which extend beyond the length of the web portions and are adapted to facilitate insertion of the corner insert into the first and second frame parts. In one embodiment of the invention, the first and second web portions extend in respective planes which intersect at an angle ranging from 80° to 95° and are tapered in cross-section in a direction toward the outer portions when viewed in plan.

Picture frame corner wedge or insert 21 of the present invention is for use in fastening together first and second frame parts of a picture frame in the form of first and second lengths of picture frame moulding 22 and 23 having respective first and second end portions 22a and 23a (See FIGS. 1 through 4). Corner insert 21 and first and second moulding lengths 22 and 23 are part of a picture frame corner construction 24 shown generally in FIG. 4. First and second moulding lengths 22 and 23 are made of wood and are profiled and slotted as shown in U.S. Pat. Nos. 4,493,582, 4,593,734, 4,632,160, 4,715,415, 4,858,664 and 4,936,360. Briefly, first and second moulding lengths 22 and 23 have respective first and second longitudinal axes 26 and 27 and first and second ends 28 and 31 cut at an approximate 45° angle to respective axes 26 and 27 so as to permit the moulding lengths to extend at right angles to each other. First and second end portions 22a and 23a each have a hole or bore 32 extending therein perpendicular to respective axes 26 and 27 and formed by an inner surface 33 and a slot 34 extending along respective axis 26 or 27 through respective end 28 or 31. A rabbet 36 is provided on each of moulding lengths 22 and 23.

Figure 1:
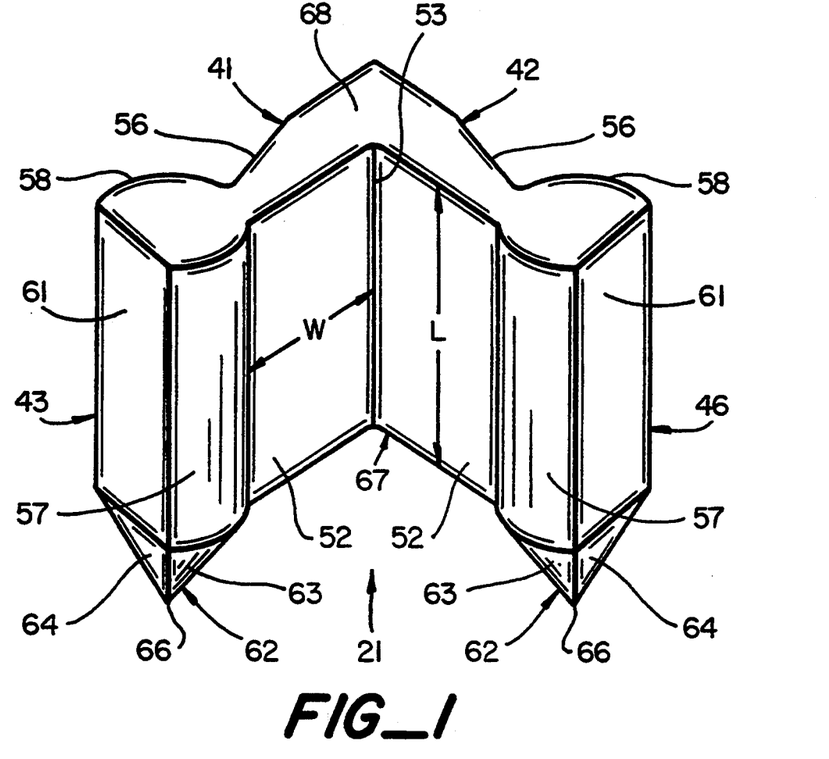
FIG. 1 is an isometric view of a resiliently yieldable picture frame corner insert of the present invention.

Corner insert 21 is formed as one piece from any suitable material such as acrylonitrile butadiene styrene (ABS), polycarbonate or impact modified styrene and includes first and second web portions 41 and 42 which extend in planes at substantially right angles to each other and have a length and a width as shown in FIG. 1 with respect to first web portion 41. More specifically, first and second web portions 41 and 42 extend in respective planes which intersect at an angle ranging from 80° to 95° but preferably less than 90°. Corner insert 21 further includes first and second generally parallel outer portions or posts 43 and 46 joined to the ends of respective web portions 41 and 42 and lying in the respective planes thereof. Web portions 41 and 42 are formed by respective inner planar surfaces 52 which join at inner corner 53 and outer planar surfaces 56 which join at an outer corner. Inner corner 53 has a radius which when measured in degrees and divided by the width of web portion 41 or 42 measured in inches results in a ratio ranging from 0.03 to 0.15. Respective inner and outer surfaces 52 and 56 of each web portion 41 and 42 extend inwardly toward each other as they approach respective post 43 or 46 so that the web portions are each tapered in cross section in a direction toward posts 43 and 46.

Each of first and second posts 43 and 46 are enlarged with respect to related web portion 41 or 42 and are generally columnar in configuration. More specifically, posts 43 and 46 each have inner and outer side surfaces 57 and 58 which extend generally arcuately outwardly from respective inner and outer surfaces 52 and 56 of the related web portion 41 or 42 and are interconnected by a generally planar surface 61. When viewed in plan or cross-section, inner and outer surfaces 57 and 58 of each post 43 and 46 form portions of a circle interconnected by a cord reflecting planar surface 61. Each of posts 43 and 46 further includes a forwardly tapered end portion 62 which is generally conical-like and extends beyond the length of related web portion 41 or 42. More specifically, each end portion 62 is formed from a cone having a conical surface 63 and having a flat side 64 which adjoins planar surface 61. Each end portion 62 has a lower tip 66. Corner insert 21 has a bottom or forward end 67 which includes end portions 62 and an opposite coplanar top or back end 68.

Figure 2:
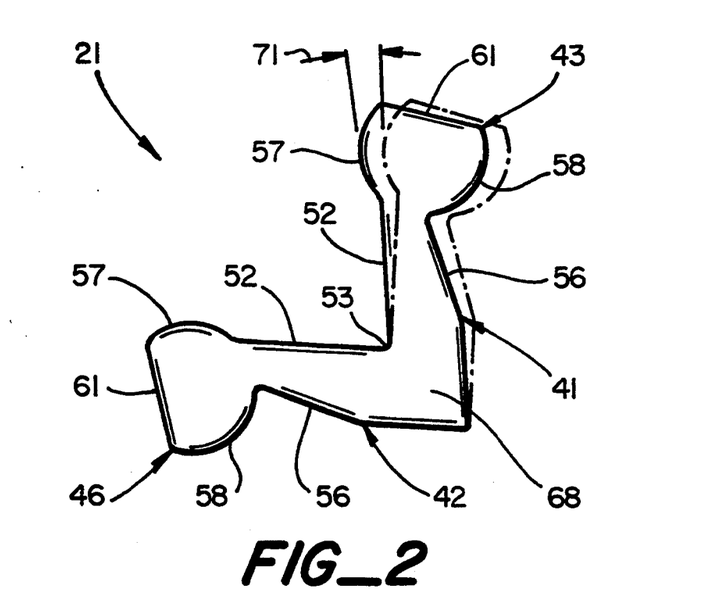
FIG. 2 is a top plan view of the resiliently yieldable picture frame corner insert shown in FIG. 1.
Figure 3:
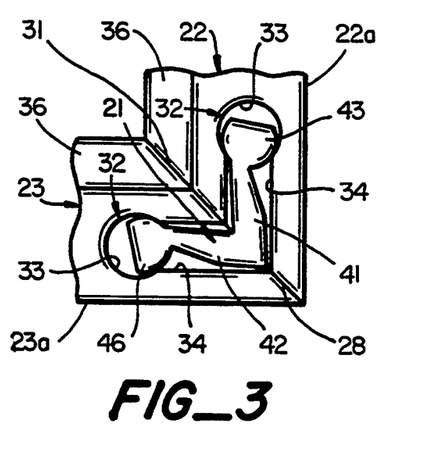
FIG. 3 is a top plan view of the resiliently yieldable picture frame corner insert shown in FIG. 1 superimposed over portions of two frame parts.
Figure 4:
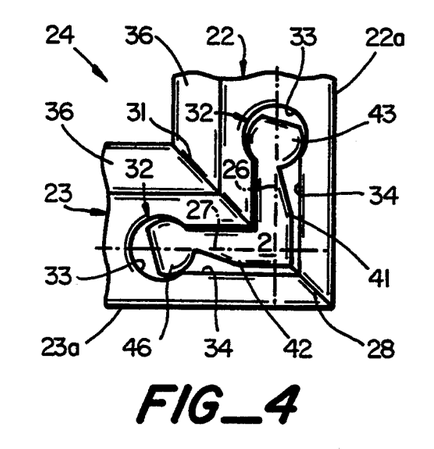
FIG. 4 is a top plan view of a picture frame corner construction of the present invention which includes the resiliently yieldable picture frame corner insert shown in FIG. 1 securing together portions of two frame parts.

First and second web portions 41 and 42 of corner insert 21 are resiliently yieldable so as to permit corner insert 21 to change from a first or relaxed position, shown in solid lines in FIG. 2, to a second or deformed position, shown in dotted lines in FIG. 2. It has been found that an acceptable modulus of elasticity for corner insert 21 can range from 200,000 to 500,000 pounds per square inch. When corner insert 21 is flexed from its relaxed condition to its deformed condition, the angular disposition between first and second web portions 41 and 42 can change by an angle, identified in FIG. 2 by item number 71, ranging from 3.8° to 9.8°.

In operation and use, corner insert 21 is secured to juxtaposed first and second end portions 22a and 23a for retaining the end portions in contact with each other. When connecting first and second moulding lengths 22 and 23 with properly profiled first and second ends 28 and 31 and properly aligned bores 32 and slots 34, corner insert 21 is placed over the moulding lengths so that first and second web portions 41 and 42 generally align with slots 34 and tips 66 of end portions 62 extend into bores 32 (See FIG. 3). In this manner, end portions 62 are adapted to facilitate insertion of corner insert 21 into moulding lengths 22 and 23.

Corner insert 21 is pressed downwardly into slots 34 and bores 32 with back end 68 providing a planar surface for any required hammering. As corner insert 21 is so pressed into end portions 22a and 23a, the engagement of conical surfaces 63 of end portions 62 with inner surfaces 33 of bores 32 causes web portions 41 and 42 to flex outwardly from each other so that the angle of inner corner 53 increases and the distance between the posts increases. The outward flexing of web portions 41 and 42 also causes posts 43 and 46 to extend further outwardly from the inner corner so as to permit disposition of the posts in bores 32. Inner corner 53 is radiused for stress relief so as to reduce stress risers thereat. The tapered cross-sectional configuration of web portions 41 and 42 tends to distribute the deflection and moment induced stress loads caused by these yieldable forces over the length of the web portions and to further reduce the stress concentration at inner radiused corner 53. As will be appreciated by those skilled in the art, undesirable stress concentration points are minimized.

The cross-sectional configuration of posts 43 and 46 generally conforms with the cross-section of bores 32 so that inner and outer side surfaces 57 and 58 of the posts snugly engage inner surfaces 33 of the bores. The resistance forces between surfaces 57 and 58 and inner surfaces 33 retain corner insert 21 in secured position within first and second end portions 22a and 23a. Resiliently yieldable first and second web portions 41 and 42 serve to apply yieldable forces against inner surfaces 33 of bores 32 which tend to urge juxtaposed first and second end portions 22a and 23a into engagement with each other.

The controlled flexibility of corner insert 21 enables aligned engagement of moulding lengths 22 and 23 with ends 28 and 31, bores 32 and/or slots 34 which are misaligned. In this regard, posts 43 and 46 are closer together than posts of conventional fasteners and, as stated above, first and second web portions 41 and 42 are resiliently yieldable. As a result, corner insert 21 can be used to properly align and join together moulding lengths 22 and 23 having misaligned bores 32 which are spaced too close to ends 28 and 31 so that when the moulding lengths are joined with one of the fasteners or inserts currently in common usage, such as that shown in U.S. Pat. No. 4,493,583, a gap ranging in size from 0.002 to 0,012 inches occurs between ends 28 and 31. Resiliently yieldable web portions 41 and 42 of corner insert 21 also permit proper aligning and joining of moulding lengths 22 and 23 having misaligned bores 32 which are spaced too far from ends 28 and 31 such that a conventional fastener currently in common usage cannot be inserted into the moulding lengths without splitting or damaging the moulding lengths and/or the fastener. In addition, first and second web portions 41 and 42 are spaced apart from the inner walls of slots 34 when they are disposed therein and thereby permit alignment of juxtaposed first and second end portions 22a and 23a when slots 34 therein are misaligned with respect to each other due to, for example, differences in the profile shaping tool or wood profile differences.

Figure 5:
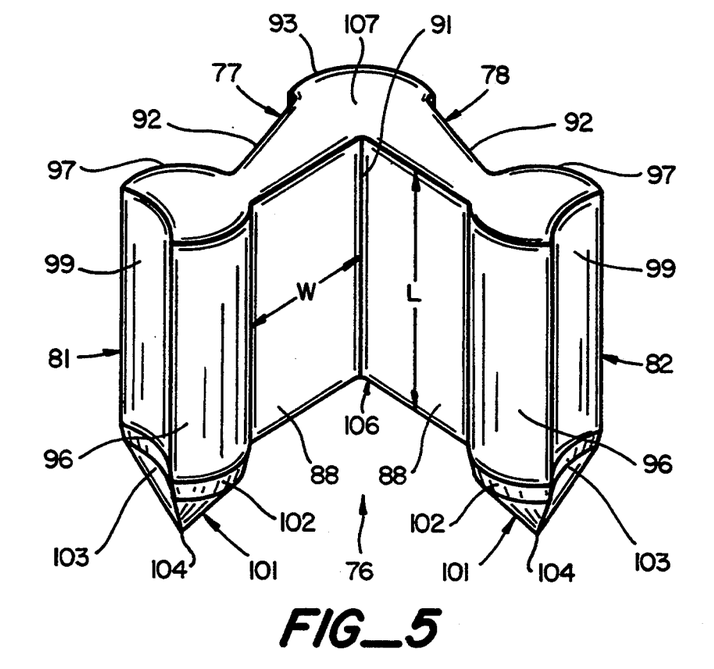
FIG. 5 is an isometric view of another embodiment of the resiliently yieldable picture frame corner insert of the present invention.

In another embodiment of the present invention, a resiliently yieldable picture frame corner insert is provided for use with a picture frame corner construction which includes first and second moulding lengths 22 and 23 (See FIG. 5). Picture frame corner insert 76 is formed as one piece of any suitable material such as glass filled polycarbonate having a modulus of elasticity ranging from 500,000 to 1,300,000 pounds per square inch. Corner insert 76 includes first and second web portions 77 and 78 which extend in planes at substantially right angles to each other and have a length and a width as shown in FIG. 5 with respect to first web portion 77. More specifically, first and second web portions 77 and 78 extend in respective planes which intersect at an angle ranging from 80° to 95° but preferably less than 90°. First and second generally parallel outer portions or posts 81 and 82 adjoin respective web portions 77 and 78 and lie in the respective planes thereof. Web portions 77 and 78 are formed by planar inner surfaces 88 which join at inner radius 91 and outer surfaces 92 which are interconnected by arcuate corner surface 93. Inner corner 91 has a radius which when measured in degrees and divided by the width of web portion 77 or 78 measured in inches results in a ratio ranging from 0.03 to 0.15. Web portions 77 and 78 are each tapered in cross-section in a direction toward respective posts 81 and 82 when viewed in plan.

First and second posts 81 and 82 are enlarged with respect to web portions 77 and 78 and are each generally columnar in confirmation. In this regard, posts 81 and 82 have inner and outer side surfaces 96 and 97 which extend generally arcuately outwardly from respective inner and outer surfaces 88 and 92 such that they form portions of a circle when posts 81 and 82 are viewed in plan. Surfaces 96 and 97 are interconnected by a concave arcuate surface 99. First and second posts 81 and 82 further include forwardly tapered end portions 101 which extend beyond the lengths of respective first and second web portions 77 and 78 and are generally conical-like in configuration. More specifically, end portions 101 each have an outer surface 102 formed from a cone having two tiers interconnected by an annular ring, the lower portion of the cone being inclined inwardly from the longitudinally extending post at an angle greater than the upper portion of the cone. Each end portion 101 further includes a concave side 103, which adjoins arcuate surface 99 of related posts 81 and 82, and a lower tip 104. Corner insert 76 has a first or forward end 106 which includes end portions 101 and an opposite second or back end 107 which is generally planar.

In operation and use, corner insert 76 is inserted into bores 32 and slots 34 of first and second moulding lengths 22 and 23 in substantially the same manner as discussed above with respect to corner insert 21. The lower portion of two-tiered end portions 101 facilitates alignment of corner insert 76 and the upper portion of end portions 101 facilitates stretching of the corner insert. As can be seen from the discussion above, the modulus of elasticity range for corner insert 76 is greater than the modulus of elasticity range for corner insert 21. As a result, corner insert 76 is generally stiffer than corner insert 21 and has a cross-section when viewed in plan of smaller area than the cross-section of corner insert 21. More specifically, narrow and tapered web portions 77 and 78, corner surface 93 and arcuate surface 99 contribute to the reduced cross-sectional configuration of corner insert 76. The two-tiered cone of end portions 101 facilitate insertion of corner insert 76 into bores 32 of first and second moulding lengths 22 and 23. Corner insert 76 can be used to properly join and align moulding lengths 22 and 23 which if joined together by a fastener or insert currently in common usage would have gaps between ends 28 and 31 ranging from 0.002 to 0.005 inches.

Figure 6:
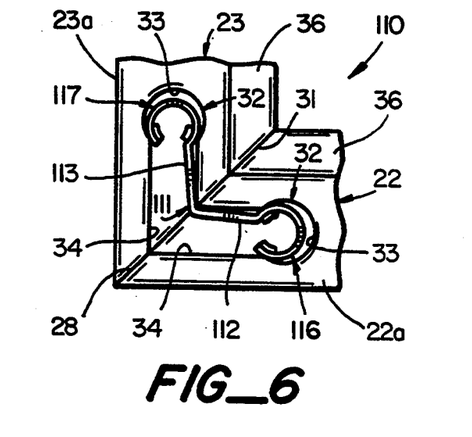
FIG. 6 is a top plan view of another embodiment of the picture frame corner construction of the present invention which includes a resiliently yieldable picture frame corner insert securing together portions of two frame parts.
Figure 7:
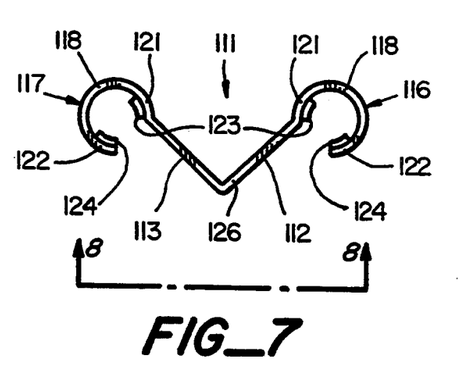
FIG. 7 is a top plan view of the resiliently yieldable picture frame corner insert shown in FIG. 6.
Figure 8:
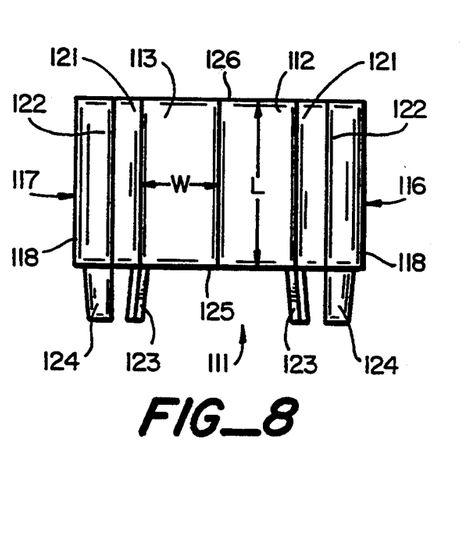
FIG. 8 is a front elevational view taken along the line 8—8 of FIG. 7.

An additional embodiment of a resiliently yieldable picture frame corner insert for use with a picture frame corner construction 110 having first and second moulding lengths 22 and 23 is shown in FIGS. 6 through 8. Picture frame corner insert 111, formed from one piece and made of any suitable material such as metal, includes resiliently yieldable first and second plates or web portions 112 and 113 and adjoining first and second hollowed outer portions or posts 116 and 117. First and second web portions 112 and 113 extend in planes at substantially right angles to each other and have a length and a width as shown in FIG. 8 with respect to first web portion 112.

Generally parallel first and second posts 116 and 117 extend from respective first and second web portions 112 and 113 and each is generally looped in cross-section and has an outer surface 118 which extends generally arcuately outwardly from the related web portion. More specifically, generally arcuate and cross-sectionally looped posts 116 and 117 each subtend an angle ranging from 240° to 360° and as shown in FIG. 7 subtend an angle of approximately 270°. Aligned first and second inner portions 121 and 122 define the angular extremities of each post 116 and 117, with first inner portion 121 adjoining the respective web portion 112 or 113 and extending outwardly from the inner surface thereof. First and second posts 116 and 117 are provided with forwardly tapered end portions in the form of inwardly inclined first and second tab members 123 and 124 which extend beyond the length of web portions 112 and 113 from respective first and second inner portions 121 and 122. Corner insert 111 has a bottom or forward end 125 which includes tab members 123 and 124 and an opposite top or back end 126 which is generally planar.

In operation and use, corner insert 111 is inserted into and operates with respect to first and second moulding lengths 22 and 23 in substantially the same manner as corner inserts 21 and 76. Tab members 123 and 124 are adapted to facilitate the insertion of corner insert 111 into bores 32 of juxtaposed first and second end portions 22a and 23a. First and second posts 116 and 117 generally conform with the cross-sectional configuration of bores 32 and first and second inner portions 121 and 122 generally engage inner surfaces 33 of bores 32. Resiliently yieldable first and second web portions 112 and 113 permit corner insert 111 to accommodate certain irregularities and misalignments of bores 32, slots 34 and ends 28 and 31 in a similar manner to that discussed above with respect to corner inserts 21 and 76. Although first and second inner portions 121 and 122 are designed to remain substantially rigid, these inner portions could be designed to resiliently bend or flex inwardly so as to contribute to the ability of corner insert 111 to accommodate irregularities or misalignments in first and second moulding lengths 22 and 23. First inner portions 121 of posts 116 and 117 serve to apply yieldable forces to inner surfaces 33 of bores 32 which tend to urge juxtaposed end portions 22a and 23a into engagement with each other.

Figure 9:
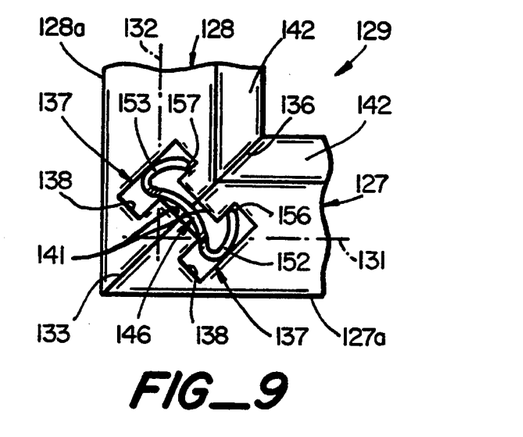
FIG. 9 is a top plan view of another embodiment of the picture frame corner construction of the present invention which includes a resiliently yieldable picture frame corner insert securing together portions of two frame parts.

The resiliently yieldable picture frame corner inserts of the present invention can also be used with first and second moulding lengths 131 and 132 mitered and slotted in the manner of the Thumbnail frame joining system by Nielsen & Bainbridge of Edison, N.J. and as generally illustrated in picture frame corner construction 129 of FIG. 9. Briefly, first and second moulding lengths 127 and 128 have respective first and second end portions 127a and 128a and respective first and second longitudinal axes 131 and 132. Additionally, moulding lengths 127 and 128 have respective first and second ends 133 and 136 which have been cut at approximately 45° with respect to respective axes 131 and 132 so that the moulding lengths extend at right angles to each other when end portion 127a and 128a are in a juxtaposed position. Each end portion 127a and 128a is provided with a hole or a bore 137 which extends perpendicular to respective longitudinal axis 131 or 132. Each bore 137 is generally rectangular in cross-section when viewed in plan and has an inner surface 138 substantially parallel to respective end 133 or 136. A slot 141 extends perpendicularly through respective ends 133 or 136 and inner surface 138 of each end portion 127a and 128a, slots 141 being aligned at an angle of approximately 45° with respective axis 131 or 132 and in colinear alignment with each other when end portions 127a and 128a are in juxtaposed position as shown in FIG. 9. First and second moulding lengths 127 and 128 each include a rabbet 142.

Figure 10:
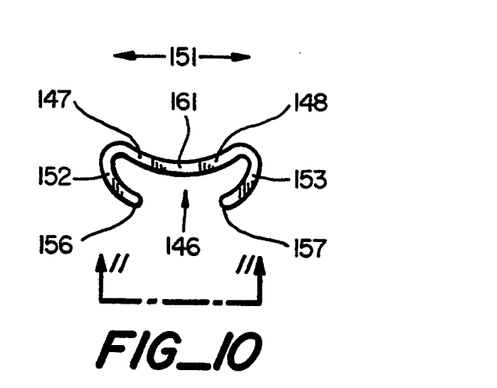
FIG. 10 is a top plan view of the resiliently yieldable picture frame corner insert shown in FIG. 9.
Figure 11:
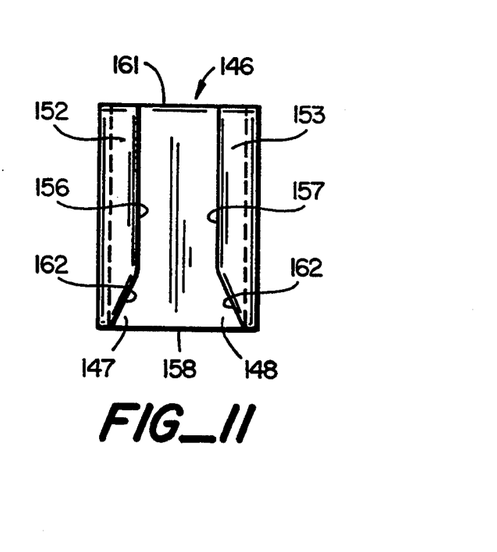
FIG. 11 is a front elevational view taken along the line 11—11 of FIG. 10.

Picture frame corner insert 146 can be secured to juxtaposed first and second portions 127a and 128a for retaining them in contact with each other and is formed from one longitudinally extending piece made of any suitable material such as plastic but preferably metal. Corner insert 146 includes first and second web portions 147 and 148 which extend in generally opposite directions shown by arrows 151 in FIG. 10 and are configured for disposition within colinearly aligned slots 141. More specifically, web portions 147 and 148 are generally arcuate in cross-section and curve inwardly in a same first direction generally perpendicular to the opposite directions shown by arrows 151. First and second outer portions 152 and 153 adjoin and arcuately extend from respective first and second web portions 147 and 148 and are each generally hooked in cross-section when viewed in plan. More specifically, first and second outer portions 152 and 153 hook outwardly from respective first and second web portions 147 and 148 in a second direction opposite from the first direction in which web portions 147 and 148 curve, and extend around so as to have opposed first and second sides 156 and 157 generally facing and in alignment with each other. Web portions 147 and 148 and outer portions 156 and 157 are generally equal in length. Corner insert 146 further includes a first or forward end 158 and an opposite parallel second or back end 161, and a forward taper 162 between each side 156 and 157 and forward end 158 (See FIG. 11).

In operation and use, corner insert 146 is positioned above bores 137 and slots 141 of first and second moulding lengths 127 and 128. Tapers 162 are adapted to facilitate alignment of first and second outer portions 152 and 153 with bores 137 and insertion of corner insert 146 into juxtaposed end portions 127a and 128a. As corner insert 146 is pressed into bores 137 and slots 141, tapers 162 further serve to cause resiliently yieldable first and second web portions 147 and 148 and resiliently yieldable first and second outer portions 152 and 153 to flex outwardly so that opposed first and second sides 156 and 157 press against inner surfaces 138 of bores 137. Planar back end 161 permits hammered insertion of corner insert 146 into first and second end portions 127a and 128a, and web portions 147 and 148 and outer portions 152 and 153 are sized and configured to permit their respective disposition in slots 141 and bores 137. When so disposed, first and second sides 156 and 157 serve to apply yieldable forces against inner surfaces 138 which tend to urge juxtaposed first and second end portions 127a and 128a into engagement with each other.

Corner insert 146 can accommodate inner or outer misalignment of bores 137. Corner insert 146 can also properly align first and second end portions 127a and 128a having improperly aligned or profiled first and second ends 133 and/or 136, and permits fine manipulation and adjustment of end portions 127a and/or 128a with misaligned slots 141 therein.

Figure 12:
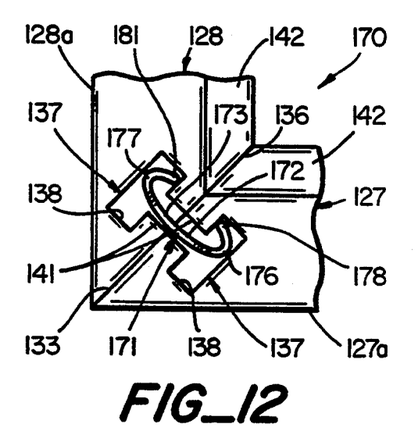
FIG. 12 is a top plan view of another embodiment of the picture frame corner construction of the present invention which includes a resiliently yieldable picture frame corner insert securing together portions of two frame parts.

The resiliently yieldable picture frame corner insert of the present invention can have other configurations and be within the scope of the present invention. A picture frame corner construction 170 which includes a picture frame corner insert 171 is shown in FIG. 12. Corner insert 171 is substantially similar to corner insert 146 and is formed as one longitudinally extending piece made of any suitable material such as plastic but preferably metal. Corner insert 171 has first and second web portions 172 and 173 substantially identical to first and second web portions 147 and 148 of corner insert 146. Web portions 172 and 173 are generally arcuate in cross-section and curve inwardly in a same first direction. Corner insert 171 further includes first and second outer portions 176 and 177 which adjoin and arcuately extend from respective first and second web portions 172 and 173 and are generally hooked in cross-section. More specifically, first and second outer portions 176 and 177 each hook inwardly from respective first and second web portions 172 and 173 in the same first direction in which the web portions curve inwardly. Aligned first and second outer portions 176 and 177 are substantially identical to first and second outer portions 152 and 153 of corner insert 146 and include opposed first and second sides 178 and 181 which generally face each other.

In operation and use, corner insert 171 is inserted into first and second moulding lengths 127 and 128 in substantially the same manner as discussed above with respect to corner insert 146, with first and second sides 178 and 181 engaging inner surfaces 138 and serving to apply yieldable forces thereto which tend to urge juxtaposed first and second end portions 127a and 128a into engagement with each other. Corner insert 171 can accommodate variations in the profile and slot alignment of first and second moulding lengths 127 and 128 and permit fine manipulation and adjustment of the fit between the joined moulding length in a manner similar to that discussed above with respect to corner inserts 21, 76, 111 and 146.

Figure 13:
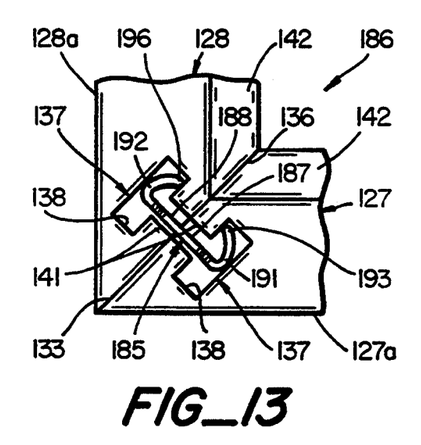
FIG. 13 is a top plan view of another embodiment of the picture frame corner construction of the present invention which includes a resiliently yieldable picture frame corner insert securing together portions of two frame parts.
Figure 14:
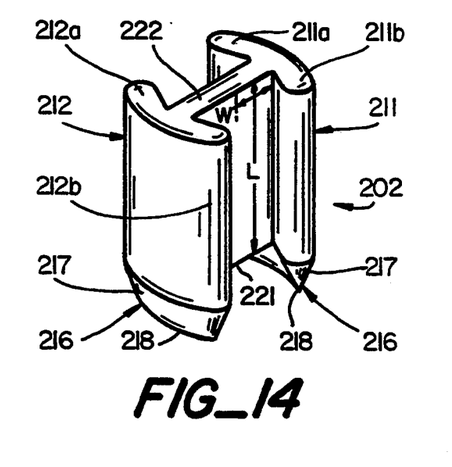
FIG. 14 is an isometric view of another embodiment of the resiliently yieldable picture frame corner insert of the present invention.
Figure 16:
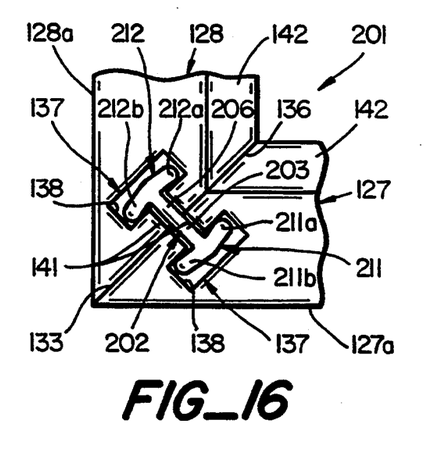
FIG. 16 is a top plan view of a picture frame corner construction of the present invention which includes the resiliently yieldable picture frame corner insert shown in FIG. 14 securing together portions of two frame parts.

In another embodiment of the resiliently yieldable picture frame corner insert of the present invention, a picture frame corner insert 185 is shown in FIG. 13 for use with a picture frame corner construction 186. Corner insert 185 is formed as one longitudinally extending piece made of any suitable material such as plastic but preferably metal. Corner insert 185 has generally coplanar first and second web portions 187 and 188 which extend in generally opposite directions and adjoining first and second outer portions 191 and 192 which extend from respective first and second web portions 187 and 188. Web portions 187 and 188 and outer portions 191 and 192 are generally equal in length. First and second outer portions 191 and 192 arcuately extend and curve inwardly from respective first and second web portions 187 and 188 in a first direction generally perpendicular to the coplanar web portions and are substantially identical in conformation to first and second outer portions 152 and 153 of corner insert 146. In this regard, first and second outer portions 191 and 192 include respective opposed first and second sides 193 and 196 which generally face and are parallel to each other. In operation and use, corner insert 185 can be inserted into and used with first and second moulding lengths 127 and 128 in substantially the same manner as corner inserts 146 and 171 discussed above. In another embodiment, a picture frame corner construction 201 is shown in FIG. 16 and includes first and second moulding lengths 127 and 128 and a picture frame corner insert 202 for fastening the moulding lengths together. Corner insert 202 is made of any suitable material such as plastic and, as shown in FIG. 14, is formed as one longitudinally extending piece having first and second web portions 203 and 206 which extend in planes in generally opposite directions. Web portions 203 and 206 each have a length and a width as shown in FIG. 14 with respect to first web portion 203. More specifically, web portions 203 and 206 are generally coplanar and sized for disposition in slots 141 of juxtaposed first and second end portions 127a and 128a.

Figure 15:
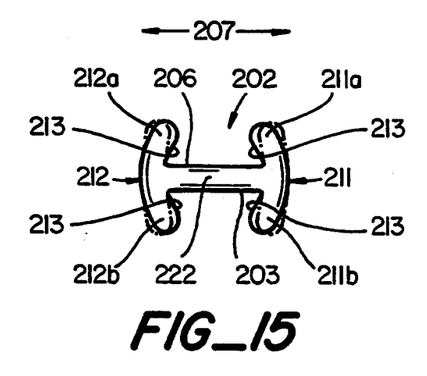
FIG. 15 is a top plan view of the resiliently yieldable picture frame corner insert shown in Figure 14.

First and second outer portions or cross members 211 and 212 adjoin respective first and second web portions 203 and 206 and are sized for disposition in bores 137 of end portions 127a and 128a. Cross members 211 and 212 are each generally arcuate in cross-section and include respective opposed first side portions 211a and 212a which curve toward each other and respective opposed second side portions 211b and 212b which also curve toward each other and are opposite respective first side portions 211a and 212a. Side portions 211a, 211b, 212a and 212b are each formed with a bearing surface 213. Additionally, the side portions are each resiliently yieldable with respective first and second web portions 203 and 206 and can resiliently bend between a first relaxed position, shown in solid lines in FIG. 15, and a second flexed position, shown in dotted lines in FIG. 15.

First and second cross members 211 and 212 are each provided with a forwardly tapered end portion 216 which extends beyond the length of respective web portion 203 or 206. Each end portion 216 is formed from an outer or inclined surface 217 which is inclined with respective longitudinally extending cross member 211 or 212 toward a leading edge 218. Corner insert 202 has a first or forward end 221 which includes end portions 216 and an opposite second or back end 222 which is generally planar.

In operation and use, corner insert 202 is inserted into first and second moulding lengths 127 and 128 by aligning end portions 216 of the corner insert with bores 137 of the moulding lengths so that inclined surfaces 217 engage inner surfaces 138 of the bores and leading edges 218 of the end portions extend into the bores. In this manner, end portions 216 are adapted to facilitate insertion of corner insert 202 into juxtaposed end portions 127a and 128a. As corner insert 202 is pressed into moulding lengths 127 and 128, inclined surfaces 217 cause side portions 211a and 212a and 211b and 212b to resiliently bend outwardly with respect to each other. Once corner insert 202 is so positioned within moulding lengths 127 and 128, bearing surfaces 213 generally abut inner surfaces 138 of bores 137 and serve to apply yieldable forces thereto which tend to urge juxtaposed first and second end portions 127a and 128a into engagement with each other.

Corner insert 202 is configured and sized so inwardly curving side portions 211a, 211b, 212a and 212b can accommodate misaligned bores having inner surfaces 138 too close to or too far from respective ends 133 or 136 of moulding lengths 127 and 128. In addition, corner insert 202 can accommodate variations in the profile of mitered first end 133 and/or second end 136 and misalignments in slots 141.

In view of the foregoing, it can be seen that a new and improved resiliently yieldable picture frame corner insert which facilitates aligned attachment of mitered and slotted picture frame parts has been provided. The corner insert is resiliently yieldable so as to accommodate variations in the profile and slot alignment of the picture frame parts and distributes deflection and stress loads therethrough to minimize undesirable stress concentration points therein. Additionally, the corner insert permits fine manipulation and adjustment of the fit between joined picture frame parts.

What is claimed is:

1. A picture frame corner construction comprising first and second elongate frame parts extending at right angles to each other and having juxtaposed end portions and longitudinal axes, each of the end portions having a hole therein extending perpendicular to the longitudinal axis of the frame part and a slot extending from the hole and through the end portion of the frame part, and a corner insert secured to the juxtaposed end portions of the first and second frame parts for retaining the juxtaposed end portions in contact with each other, the corner insert being formed as one piece and having first and second web portions disposed in the slots and having first and second outer portions disposed in the holes, the web portions forming means for applying yieldable forces tending to urge the juxtaposed end portions into engagement with each other.

2. A picture frame corner construction as in claim 1 wherein said web portions are tapered in cross-section in plan in a direction toward said outer portions.

3. A picture frame corner construction as in claim 2 wherein said web portions extend in respective planes which intersect at an angle ranging from 80° to 95°.

4. A picture frame corner construction as in claim 1 wherein said outer portions are enlarged with respect to said web portions and are generally columnar and parallel to each other.

5. A picture frame corner construction as in claim 4 wherein said outer portions are hollow.

6. A picture frame corner construction as in claim 1 wherein said first and second web portions extend in generally opposite directions and wherein said first and second outer portions are hooked in cross-section.

7. A picture frame corner insert for use in fastening together first and second frame parts of a picture frame, comprising a one piece body adapted for insertion into the first and second frame parts, the body having first and second web portions which extend in planes at substantially right angles to each other and have a length and a width and having first and second generally parallel outer portions which adjoin the respective web portions and lie in the respective planes thereof, the web portions forming means for applying yieldable forces tending to urge the frame parts into engagement with each other and being tapered in cross-section in a direction toward the outer portions, the outer portions being formed with a surface which extends generally arcuately outwardly from the web portions and forwardly tapered end portions which extend beyond the length of the web portions to facilitate insertion of the corner insert into the first and second frame parts.

8. A picture frame corner insert as in claim 7 wherein said end portions are conical-like.

9. A picture frame corner insert as in claim 7 wherein said first and second web portions each have a substantially equal width and are joined by an inner corner having a radius which when measured in degrees and divided by the width of a web portion measured in inches results in a ratio ranging from 0.03 to 0.15.

10. A picture frame corner insert for use in fastening together first and second frame parts of a picture frame, the corner insert formed as one piece and having first and second web portions which extend in planes at substantially right angles to each other and have a length and a width and having first and second outer portions which adjoin the respective web portions and are looped in cross-section, the outer portions having forwardly tapered end portions which extend beyond the length of the web portions and are adapted to facilitate insertion of the corner insert into the first and second frame parts.

11. A picture frame corner insert as in claim 10 wherein each of said outer portions is generally arcuate in cross-section and subtends an angle ranging from 240° to 360°.

12. A picture frame corner insert as in claim 10 wherein said end portions include first and second inwardly inclined tab members.

13. A picture frame corner insert for use in fastening together first and second frame parts of a picture frame, the corner insert formed as one longitudinally extending piece with a forward end and having first and second web portions which extend in generally opposite directions and first and second outer portions which adjoin the respective web portions and are hooked in cross-section, the first and second outer portions having opposed first and second sides generally facing each other and a forward taper extending between each side and the forward end adapted to facilitate insertion of the corner insert into the first and second frame parts.

14. A picture frame corner insert as in claim 13 wherein said first and second web portions are generally coplanar.

15. A picture frame corner insert as in claim 13 wherein said first and second web portions are generally arcuate in cross-section and curve inwardly in a same first direction generally perpendicular to said opposite directions.

16. A picture frame corner insert as in claim 15 wherein said first and second outer portions hook inwardly from the respective first and second web portions in the first direction.

17. A picture frame corner insert as in claim 15 wherein said first and second outer portions hook outwardly from the respective first and second web portions in a second direction opposite from the first direction.

18. A picture frame corner construction comprising first and second elongate frame parts extending at right angles to each other and having juxtaposed end portions and longitudinal axes, each of the end portion having a hole therein extending perpendicular to the longitudinal axis of the frame part and a slot extending from the hole and through the end portions of the frame part, the slots being generally colinear with each other, and a corner insert secured to the juxtaposed end portions of the first and second frame parts for retaining the juxtaposed end portions in contact with each other, the corner insert being formed as one piece and having first and second web portions extending in generally opposite directions and disposed in the slots and having first and second outer portions extending in a direction generally perpendicular to the opposite directions and disposed in the holes, the outer portions being resiliently yieldable and serving to apply yieldable forces tending to urge the juxtaposed end portions into engagement with each other.

19. A picture frame corner construction as in claim 18 wherein said first and second web portions are generally arcuate in cross-section and curve inwardly in a same first direction generally perpendicular to said opposite directions and wherein said first and second outer portions arcuately extend from the respective web portions and are hooked in cross-section, the first and second outer portions having opposed first and second sides generally facing each other.

20. A picture frame corner construction as in claim 18 wherein said first and second outer portions are arcuate in cross-section and include respective opposed first side portions which curve toward each other and respective opposed second side portions which curve toward each other.

21. A picture frame corner insert for use in fastening together first and second frame parts of a picture frame, the corner insert formed as one longitudinally extending piece and having first and second web portions which extend in planes in generally opposite directions and have a length and a width and first and second outer portions which adjoin the respective web portions and are arcuate in cross-section, the outer portions including respective opposed first side portions which curve toward each other and respective opposed second side portions which curve toward each other, the first and second outer portions having forwardly tapered end portions which extend beyond the length of the web portions and are adapted to facilitate insertion of the corner insert into the first and second frame parts.

22. A picture frame corner insert as in claim 21 wherein said first and second web portions are generally coplanar.

23. A picture frame corner insert for use in fastening together first and second elongate frame parts extending at right angles to each other and having juxtaposed end portions and longitudinal axes, each of the end portions having a hole therein extending perpendicular to the longitudinal axis of the frame part and a slot extending from the hole and through the end portion of the frame part, comprising a one piece body having first and second web portions adapted to be disposed in the slots of the frame parts and having first and second outer portions adapted to be disposed in the holes of the frame parts, the web portions forming means for applying yieldable forces tending to urge the juxtaposed end portions into engagement with each other.

24. A picture frame corner insert as in claim 23 wherein said web portions are tapered in cross-section in plan in a direction toward said outer portions.

25. A picture frame corner insert as in claim 24 wherein said web portions extend in respective planes which intersect at an angle ranging from 80° to 95°.

26. A picture frame corner insert as in claim 23 wherein said outer portions are enlarged with respect to said web portions and are generally columnar and parallel to each other.

* * * * *